United States Patent
Janabi

(10) Patent No.: US 12,090,011 B2
(45) Date of Patent: Sep. 17, 2024

(54) SUCTION TOOL

(71) Applicant: Anmar Janabi, Baltimore, MD (US)

(72) Inventor: Anmar Janabi, Baltimore, MD (US)

(*) Notice: Subject to any disclaimer, the term of this patent is extended or adjusted under 35 U.S.C. 154(b) by 845 days.

(21) Appl. No.: 17/115,511

(22) Filed: Dec. 8, 2020

(65) Prior Publication Data

US 2021/0085438 A1 Mar. 25, 2021

Related U.S. Application Data

(63) Continuation-in-part of application No. 16/920,605, filed on Jul. 3, 2020, now abandoned.

(51) Int. Cl.
- *A61C 17/10* (2006.01)
- *A61C 5/82* (2017.01)
- *A61C 17/08* (2006.01)

(52) U.S. Cl.
CPC ............ *A61C 17/10* (2019.05); *A61C 5/82* (2017.02); *A61C 17/08* (2019.05)

(58) Field of Classification Search
CPC ........... A61C 17/08; A61C 17/10; A61C 5/82; A61M 1/76; A61M 1/77; A61M 1/772; A61M 1/774; A61M 1/86; A61M 1/87
See application file for complete search history.

(56) References Cited

U.S. PATENT DOCUMENTS

| | | | |
|---|---|---|---|
| 2004/0197732 A1* | 10/2004 | Sullman | A61C 17/08 433/94 |
| 2007/0148619 A1* | 6/2007 | Anderson | A61C 17/08 433/136 |
| 2019/0298163 A1* | 10/2019 | Tavor | A61B 1/253 |
| 2020/0275991 A1* | 9/2020 | Abedi | A61C 5/82 |

* cited by examiner

*Primary Examiner* — Jacqueline T Johanas
*Assistant Examiner* — Drew S Folgmann
(74) *Attorney, Agent, or Firm* — Barry Choobin; Patent 360

(57) ABSTRACT

The present invention is directed to a suction tool that can connect to a suction hose for sucking substances from an oral cavity during a rubber dam isolated endodontic procedure. The suction tool includes a body having an inlet for connecting with a suction hose. A suction window can be configured in the body, wherein the suction window is in fluid communication with the suction inlet. Substances that are used during a dental procedure, such as cooling water can be sucked through the suction window. The suction tool further includes a magnet configured on the body of the suction tool and adapted to magnetically couple with the clamp of the rubber dam.

11 Claims, 5 Drawing Sheets

SUCTION TOOL

CROSS-REFERENCE TO RELATED APPLICATIONS

This application is a continuation-in-part of a U.S. Non-provisional patent application Ser. No. 16/920,605 filed Jul. 3, 2020, which claims priority from a U.S. provisional patent application Ser. No. 62/829,175 filed Apr. 4, 2019, both of which are incorporated herein by reference in its entirety.

FIELD OF INVENTION

The present disclosure relates to the field of dentistry, and particularly, the present invention relates to a suction tool for use in an endodontic procedure.

BACKGROUND

In a typical endodontic procedure, suctioning is almost always a necessary procedure for removing substances (such as water, saliva, caustic substances, etc.). A dental suction assembly that includes a suction tool connected to a suction hose is used for sucking the substances from the mouth. In an endodontic procedure, the suctioning may be needed frequently, however, the dentist cannot continuously keep holding the suction hose during the procedure. During intervals between the suctioning, the suction hose is generally handed over to an assistant, so the dentist can conduct the procedure. However, having a dental assistant just for holding the suction tube can increase the cost of a dental procedure.

Thus, a need is appreciated for an improved suction tool that can be held within reach of a dentist performing the dental procedure and without any assistance.

SUMMARY OF THE INVENTION

The principal object of the present invention is therefore directed to a suction tool that can connect to a suction hose.

It is another object of the present invention that the suction tool attaches to a dental dam.

It is a further object of the present invention that the suction tool can be held within reach of a dentist performing a dental procedure.

It is another object of the present invention that the suction tool can be held close to the dentist during the dental procedure.

It is an additional object of the present invention that the suction tool is easy to use.

It is a further objective of the present invention that the suction tool is economical to manufacture.

In one implementation, disclosed is a suction tool that can connect to a suction hose for sucking substances from an oral cavity during a rubber dam isolated endodontic procedure. The suction tool can be of a hollow body having an inlet for connecting the suction hose. A suction window can be configured in the hollow body, wherein the suction window is in fluid communication with the suction inlet. The suction tool further includes a magnet configured on the hollow body.

In one aspect, the suction window and the hollow body can be configured in a form of a tray, wherein the magnet attached on the bottom side of the tray.

In one aspect, the suction tool further comprises an outlet for attaching an extension, the outlet can be in fluid communication with the inlet.

In one aspect, the hollow body is having a proximal end, a central section, and a distal end. The inlet is configured at the proximal end of the hollow body, the outlet can be configured at the distal end of the hollow body, and the suction window can be configured in the central section of the hollow body.

In one aspect, disclosed is a method of removing substances from the mouth during a rubber dam isolated endodontic procedure. The method comprising connecting the disclosed suction tool to a suction hose and attaching the suction tool to a clamp of the rubber dam through the magnet.

BRIEF DESCRIPTION OF THE DRAWINGS

The accompanying figures, which are incorporated herein, form part of the specification and illustrate embodiments of the present invention. Together with the description, the figures further explain the principles of the present invention and to enable a person skilled in the relevant arts to make and use the invention.

DETAILED DESCRIPTION

Figure 1:
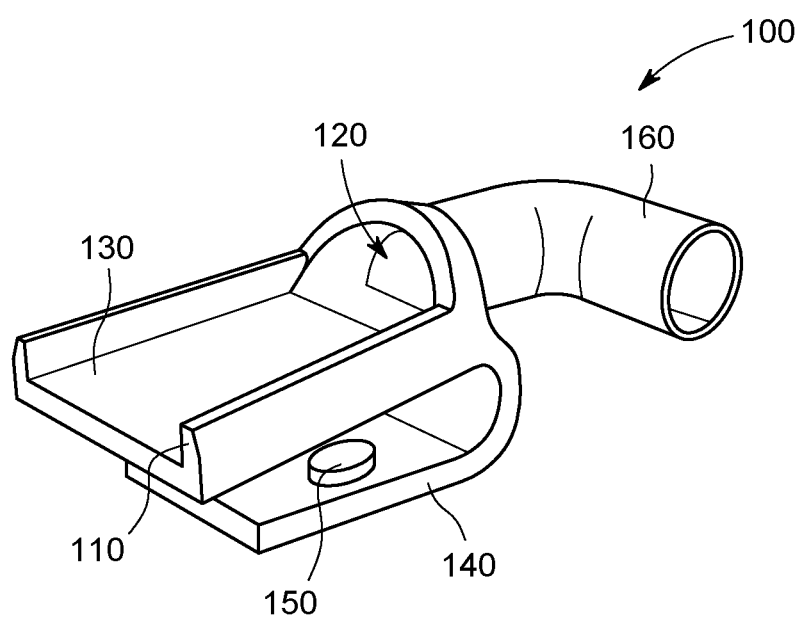
FIG. 1 illustrates an implementation of the suction tool configured as a suction tray.

Subject matter will now be described more fully hereinafter. Subject matter may, however, be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, the subject matter may be embodied as apparatuses and methods of use thereof. The following detailed description is, therefore, not intended to be taken in a limiting sense.

The word "exemplary" is used herein to mean "serving as an example, instance, or illustration." Any embodiment described herein as "exemplary" is not necessarily to be construed as preferred or advantageous over other embodiments. Likewise, the term "embodiments of the present invention" does not require that all embodiments of the invention include the discussed feature, advantage, or mode of operation.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

The following detailed description includes the best currently contemplated mode or modes of carrying out exemplary embodiments of the invention. The description is not to be taken in a limiting sense but is made merely for the purpose of illustrating the general principles of the invention, since the scope of the invention will be best defined by the allowed claims of any resulting patent.

The following detailed description is described with reference to the drawings, wherein like reference numerals are used to refer to like elements throughout. In the following description, for purposes of explanation, specific details may be set forth in order to provide a thorough understanding of the subject innovation. It may be evident, however, that the claimed subject matter may be practiced without these specific details. In other instances, well-known structures and devices are shown in block diagram form in order to facilitate describing the subject innovation. Moreover, the drawings may not be to a scale.

Figure 2:
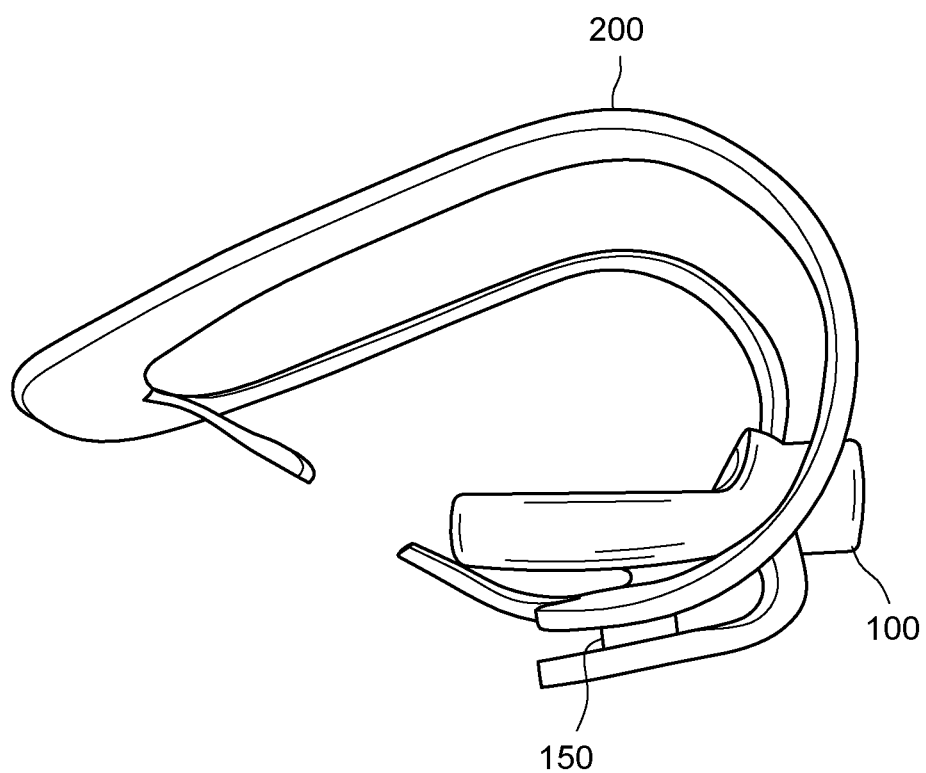
FIG. 2 shows the suction tool of FIG. 1 secured to a clamp.

Disclosed is a suction tool that can be attached to a hose for sucking substances from the mouth, such as cooling water and like substances during a rubber dam isolated endodontic procedure. The hose can be connected to a suction source for sucking the substances. Now referring to FIG. 1, which shows one implementation of the suction tool 100. The suction tool 100 includes a body 110 that is of a tray configuration. The upper part 130 of the tray shaped body 110 forms a suction window which receives the substances. The suction window 130 is in fluid communication with an inlet 120. An elbow-shaped sleeve joint 160 can be see integrated with the inlet 120. To the elbow sleeve joint 160 can connect the suction hose. Additionally, can be seen in FIG. 1 is a lip 140 that extends from an end of the tray shaped body 110, the end is adjacent to the inlet 120. The lip 140 curves and extends in a direction of the length of the tray-shaped body 110. The tray-shaped body 110 and the lip 140 forms a U-shaped loop that can receive the wall of a clamp, the clamp is of a dental dam. FIG. 2 shows a clamp 200 of a dental dam, wherein the U-shaped loop formed by the tray shaped body 110 and the lip 140 can be seen on to the wall of the clamp 200.

The suction tool disclosed herein further includes a magnet configured in the body of the suction tool and provides for magnetic attachment with the clamp. FIG. 1 shows the magnet 150 configured on the upper side of the lip 140. The upper side of the lip 140 faces the tray shaped body 110. The magnet 150 provides for temporary holding the suction tool at the clamp during a dental procedure. FIG. 2 shows the suction tool 100 slidably clasps to the wall of the clamp, wherein the magnet 150 holds the suction tool against the metallic clamp 200 through the magnetic force. The suction tool can be adapted to fit distinct groups of teeth. The clamp 200 shown in FIG. 2 best fits into mandibular anterior teeth. Due to space restrictions in the mandibular anterior teeth region, the suction tool 100 can be provided with an elbow joint 160 which allows a hose to reach the suction tool.

Figure 3:
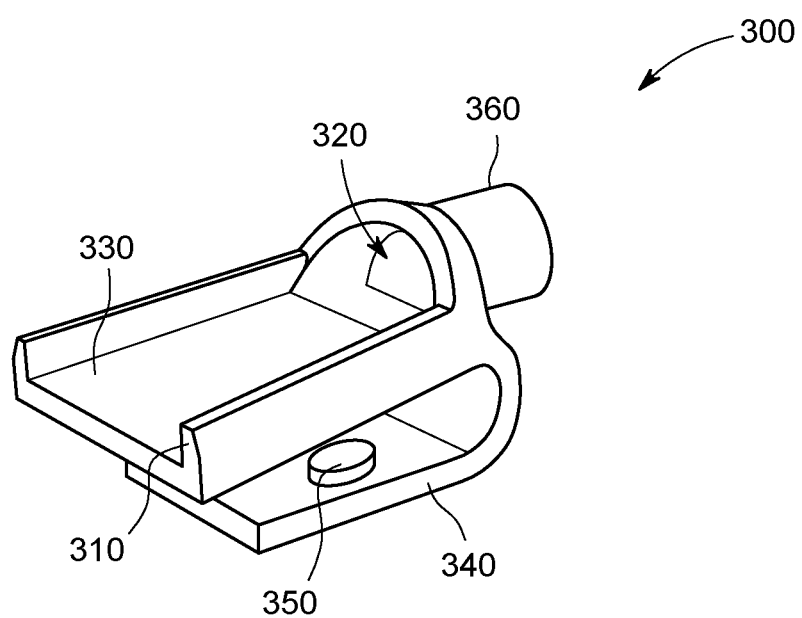
FIG. 3 shows another implementation of a tray shaped suction tool.

Referring to FIG. 3 which shows another implementation of the suction tool 300. The suction tool 300 shown in FIG. 3 is similar to the suction tool 100 shown in FIG. 1 except having the tubular sleeve inlet 360 in place of the elbow joint 160 shown in FIG. 1. The suction tool 300 shown in FIG. 3 is having the tray shaped body 310, an inlet 320, a suction window 330 in fluid communication with the inlet 320. Also, is shown a tubular joint 360 integrated with inlet 320. Lip 340 extends from the end of the tray-shaped body 330 adjacent to the inlet 320. The lip 340 and the tray-shaped body 330 form a loop that can receive a wall of a clamp. The clamp can be similar to the clamp shown in FIG. 2. The magnet 350 holds the suction tool 300 magnetically against a metallic clamp. The suction tool 300 can be used when treating the maxillary anterior teeth, wherein enough space is available for the suction hose.

Figure 4:
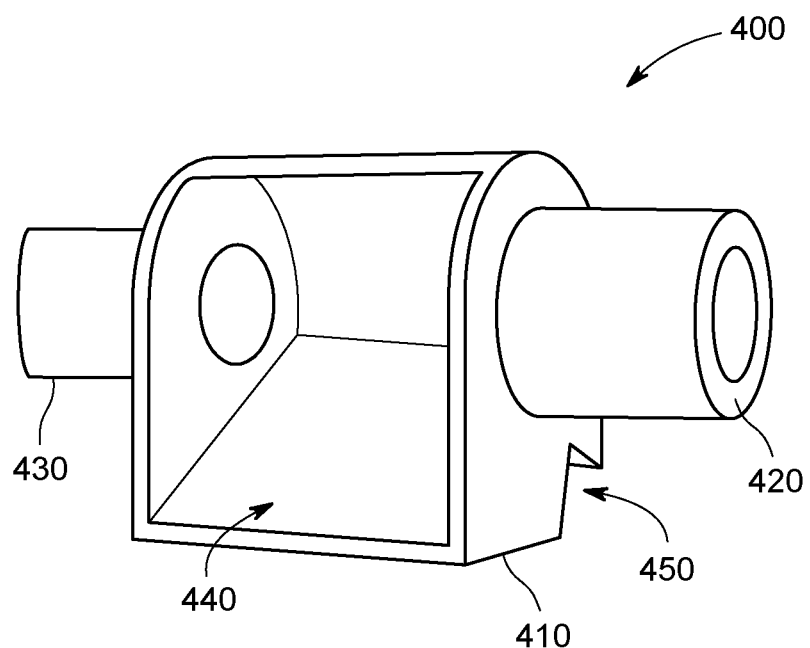
FIG. 4 shows another implementation of a box-shaped suction tool.
Figure 5:
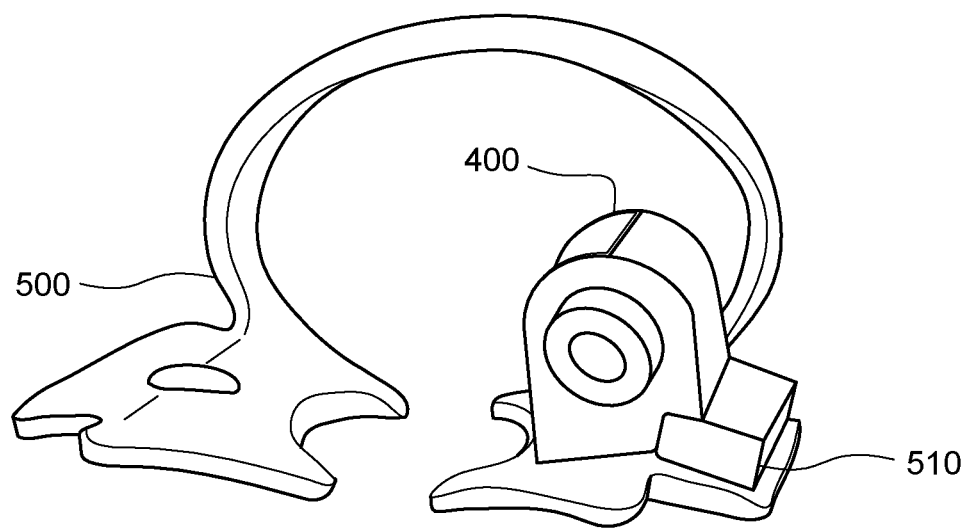
FIG. 5 shows the suction tool of FIG. 4 attached to a clamp.

Referring to FIG. 4 which shows another implementation of the suction tool. The suction tool 400 shown in FIG. 4 is of a box configuration. The box configuration can be used for treating maxillary and mandibular posterior teeth. The suction tool 400 includes a box-shaped body 410 that is of a hollow configuration. The box-shaped body having a proximal end and a distal end. The box-shaped body 410 having an inlet 420 and an outlet 430. The inlet 420 can connect with a suction hose while the outlet can connect with an extension. The box-shaped body 410 is shown to have a suction window 440 for receiving substances from the mouth during a rubber dam isolated endodontic procedure. The box-shaped body 410 is also shown to have a cavity 450 to which a magnet can be attached. FIG. 5 shows the suction tool 400 attached to a clamp 500. The suction tool 400 is configured with a magnet 500 at its rear side, wherein the magnet magnetically couples with the metallic clamp. The inlet of the suction tool 400 can be seen in FIG. 5 which can connect to a suction hose. The suction window of the suction tool 400 faces inwards towards the clamp and away from the magnet.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above-described embodiment, method, and examples, but by all embodiments and methods within the scope and spirit of the invention as claimed.

What is claimed is:

1. An endodontic method comprising:
   providing a rubber dam into a mouth of a patient for an endodontic procedure, the rubber dam having a metallic clamp;
   providing a suction tool, the suction tool comprising:
      a body having an inlet, the inlet configured to connect with a suction hose, a suction window configured in the body, the suction window configured to receive substances from a mouth, the suction window in fluid communication with the inlet, and
      a magnet configured on an outer surface of the body, the magnet configured to magnetically attach the suction tool with the metallic clamp;
   attaching the suction hose to the inlet; and
   attaching the suction tool to the metallic clamp.

2. The method according to claim 1, wherein the body and the suction window are configured as a tray shaped body.

3. The method according to claim 2, wherein the suction tool further comprises a lip that extends from an end of the tray shaped body, the end is adjacent the inlet, the lip and the tray shaped body forms a U-shaped loop.

4. The method according to claim 3, wherein the magnet is configured on an upper side of the lip, the upper side of the lip faces the tray shaped body.

5. The method according to claim 3, wherein the suction tool further comprises a tubular sleeve joint integrated with the inlet, the tubular sleeve joint attaches with the suction tube.

6. The method according to claim 3, wherein the suction tool further comprises an elbow sleeve joint integrated with the inlet, the elbow sleeve joint attaches with the suction tube.

7. The method according to claim 3, wherein the loop is configured to slidably clasps to a wall of the clamp, wherein the magnet attaches to the wall of the metallic clamp.

8. The method according to claim 1, wherein the body is a hollow closed body, the inlet and the suction window are configured in the hollow closed body, the magnet is attached to an outer surface of the hollow closed body.

9. The method according to claim 8, wherein the suction tool further comprises an outlet configured in the hollow closed body, the outlet in fluid communication with the inlet.

10. An assembly for use during a rubber dam isolated endodontic procedure, the assembly comprising:
   a dental dam comprising a metallic clamp;
   a suction tool comprising:
      a body having an inlet, the inlet configured to connect with a suction hose;
      a suction window configured in the body, the suction window configured to receive substances from a mouth, the suction window in fluid communication with the inlet; and
      a magnet configured on an outer surface of the body, the magnet configured to magnetically couple the suction tool with the metallic clamp.

11. The suction tool of claim 10, wherein the clamp is configured to fit onto a mandibular anterior teeth region and an elbow-shaped sleeve joint is integrated with the inlet, wherein the suction hose is connected to the elbow-shaped sleeve joint.

* * * * *